US010740400B2

(12) United States Patent
Bakir et al.

(10) Patent No.: US 10,740,400 B2
(45) Date of Patent: Aug. 11, 2020

(54) IMAGE ANALYSIS FOR RESULTS OF TEXTUAL IMAGE QUERIES

(71) Applicant: Google LLC, Mountain View, CA (US)

(72) Inventors: Gokhan H. Bakir, Zürich (CH); Marcin Bortnik, Zürich (CH); Malte Nuhn, Zürich (CH); Kavin Karthik Ilangovan, Zürich (CH)

(73) Assignee: Google LLC, Mountain View, CA (US)

( * ) Notice: Subject to any disclaimer, the term of this patent is extended or adjusted under 35 U.S.C. 154(b) by 157 days.

(21) Appl. No.: 16/114,788

(22) Filed: Aug. 28, 2018

(65) Prior Publication Data

US 2020/0074014 A1 Mar. 5, 2020

(51) Int. Cl.

| | |
|---|---|
| ***G06F 16/9032*** | (2019.01) |
| ***G10L 13/08*** | (2013.01) |
| ***G06T 7/00*** | (2017.01) |
| ***G10L 15/22*** | (2006.01) |
| ***G06K 9/62*** | (2006.01) |
| ***G06F 16/58*** | (2019.01) |
| ***G06F 16/9038*** | (2019.01) |

(52) U.S. Cl.

CPC .... *G06F 16/90332* (2019.01); *G06F 16/5866* (2019.01); *G06F 16/9038* (2019.01); *G06K 9/6267* (2013.01); *G06T 7/97* (2017.01); *G10L 13/08* (2013.01); *G10L 15/22* (2013.01); *G10L 2015/221* (2013.01)

(58) Field of Classification Search

CPC ........... G06F 16/90332; G06F 16/5866; G06F 16/9038; G10L 13/08; G10L 15/22; G10L 15/221; G06T 7/97; G06K 9/6267

USPC .......................................................... 707/722

See application file for complete search history.

(56) References Cited

U.S. PATENT DOCUMENTS

| | | | |
|---|---|---|---|
| 5,659,742 A * | 8/1997 | Beattie .................... | G06F 16/40 |
| 6,182,066 B1 * | 1/2001 | Marques ............. | G06F 16/9535 |
| 7,986,843 B2 | 7/2011 | Chaudhury et al. | |
| 8,897,579 B2 | 11/2014 | Chaudhury et al. | |

(Continued)

OTHER PUBLICATIONS

Cai, Keke, et al., "Automatic Query Type Classification for Web Image Retrieval", MUE 2007, Seoul, South Korea, Apr. 26-28, 2007, pp. 1021-1026.*

(Continued)

*Primary Examiner* — Robert Stevens

(74) *Attorney, Agent, or Firm* — Dority & Manning, P.A.

(57) ABSTRACT

Methods, systems, and apparatus, including computer programs encoded on computer storage media, for analyzing images for generating query responses. One of the methods includes determining, using a textual query, an image category for images responsive to the textual query, and an output type that identifies a type of requested content; selecting, using data that associates a plurality of images with a corresponding category, a subset of the images that each belong to the image category, each image in the plurality of images belonging to one of the two or more categories; analyzing, using the textual query, data for the images in the subset of the images to determine images responsive to the textual query; determining a response to the textual query using the images responsive to the textual query; and providing, using the output type, the response to the textual query for presentation.

24 Claims, 5 Drawing Sheets

(56) References Cited

U.S. PATENT DOCUMENTS

| | | | | |
|---|---|---|---|---|
| 8,909,625 | B1 * | 12/2014 | Stewenius | G06F 16/54 707/723 |
| 9,317,534 | B2 * | 4/2016 | Brandt | G06F 16/532 |
| 9,372,920 | B2 | 6/2016 | Bengio et al. | |
| 2011/0191336 | A1 * | 8/2011 | Wang | G06F 16/00 707/728 |
| 2012/0117051 | A1 * | 5/2012 | Liu | G06F 16/43 707/707 |
| 2014/0310255 | A1 * | 10/2014 | Cardell | G06F 16/951 707/706 |
| 2015/0161176 | A1 * | 6/2015 | Majkowska | G06F 16/532 707/722 |
| 2016/0342895 | A1 | 11/2016 | Gao et al. | |

OTHER PUBLICATIONS

Wang, Shuo, et al., "IGroup: Presenting Web Image Search Results in Semantic Clusters", CHI 2007 Proceedings—Web Usability, San Jose, CA, Apr. 28-May 3, 2007, pp. 587-596.*

Mukherjea, Sougata, et al., "AMORE: A World Wide Web image retrieval engine", World Wide Web, vol. 2, © 1999, pp. 115-132.*

Vijayanarasimhan, Sudheendra, et al., "Keywords to Visual Categories: Multiple-Instance Learning for Weakly Supervised Object Categorization", CVPR 2008, Anchorage, AK, Jun. 23-28, 2008, pp. 1-8.*

Fergus, Rob, et al., "Learning Object Categories from Internet Image Searches", Proceedings of the IEEE, vol. 98, No. 8, Aug. 2010, pp. 1453-1466.*

Koskela, Markus, et al., "Use of Image Subset Features in Image Retrieval with Self-Organizing Maps", CIVR 2004, LNCS 3115, Springer-Verlag, Berlin, Germany, © 2004, pp. 508-516.*

Wang, Xiaogang, et al., "Web Image Re-Ranking Using Query-Specific Semantic Signatures", IEEE Transactions on Pattern Analysis and Machine Intelligence, vol. 36, No. 4, Apr. 2014, pp. 810-823.*

Ogle, Virginia E., et al., "Chabot: Retrieval from a Relational Database of Images", Computer, vol. 28, Issue 9, Sep. 1995, pp. 40-48.*

'9to5google.com' [online] "Google app 7.26 preps emails on Home, receals Assistant reservations, smart displays UI, more [APK Insight]," Abner Li, Apr. 5, 2018, [retrieved on Jun. 12, 2018] Retrieved from Internet: URL<https://9to5google.com/2018/04/05/google-app-7-26-apk-insight-teardown> 8 pages.

'promo.bankofamerica.com' [online] "Erica is here and ready to help," Publication date: Unknown, [retrieved on Jun. 4, 2018] Retrieved from Internet: URL<https://promo.bankofamerica.com/erica/faqs/> 8 pages.

'www.hubdoc.com' [online] "How it works," Available on or before Oct. 5, 2015 via the wayback internet archive [retrieved on Aug. 27, 2018] Retrieved from Internet: URL<https://www.hubdoc.com/how-it-works> 8 pages.

'www.pocket-lint.com' [online] "What is Google Lens, how does it work, and which devices have it?" Hall et al. Jun. 6, 2018, [retrieved on Jun. 12, 2018] Retrieved from Internet: URL<https://www.pocket-lint.com/apps/news/google/141075-what0is-google-lens-and-how-does-it-work-and-which-devices-have-it> 15 pages.

* cited by examiner

IMAGE ANALYSIS FOR RESULTS OF TEXTUAL IMAGE QUERIES

BACKGROUND

This specification relates to classifying images and generating image search results.

The Internet provides access to a wide variety of resources, for example, video files, image files, audio files, or Web pages, including content for particular subjects, book articles, or news articles. A search system can select one or more resources in response to receiving a search query. A search query is data that a user submits to a search engine to satisfy the user's informational needs. The search queries are usually in the form of text, e.g., one or more query terms, and may include transcriptions of spoken search queries. The search system selects and scores resources based on their relevance to the search query and on their importance relative to other resources to provide search results. The search results are typically ordered according to the scores and presented according to this order.

SUMMARY

An image query processing system may classify images into categories and use the image categories to determine images responsive to a textual query. The image query processing system can access a database of images, stored on a device, that are each associated with a category from multiple, different image categories. When the image query processing system receives a textual query, the image query processing system can determine one or more categories from the multiple, different image categories that likely include images responsive to the textual query. The image query processing system can then analyze images in the one or more determined categories to select images responsive to the textual query and display the selected images.

In general, one innovative aspect of the subject matter described in this specification can be embodied in methods that include the actions of determining, using a textual query, an image category for images responsive to the textual query, and an output type that identifies a type of requested content; selecting, using data that associates a plurality of images with a corresponding category, a subset of the images that each belong to the image category, each image in the plurality of images belonging to one of two or more categories; analyzing, using the textual query, data for the images in the subset of the images to determine images responsive to the textual query; determining a response to the textual query using the images responsive to the textual query; and providing, using the output type, the response to the textual query for presentation. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of determining, using a textual query, an image category for images responsive to the textual query, and an output type that identifies a type of requested content; selecting, using data that associates a plurality of images with a corresponding category, a subset of the images that each belong to the image category, each image in the plurality of images belonging to one of two or more categories; analyzing, using the textual query, data for the images in the subset of the images to determine images responsive to the textual query; selecting, for each image responsive to the textual query using the output type, a portion of the image that depicts data responsive to the textual query; generating instructions for presentation of a user interface that emphasizes, for each image responsive to the textual query, the portion of the image that depicts the data responsive to the textual query; and providing the instructions to a display to cause the display to present the user interface and at least one of the images responsive to the textual query. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of determining, using a textual query, an image category for images responsive to the textual query, and an output type that identifies a type of requested content; selecting, using data that associates a plurality of images with a corresponding category, a subset of the images that each belong to the image category, each image in the plurality of images belonging to one of two or more categories; analyzing, using the textual query, data for the images in the subset of the images to determine images responsive to the textual query; selecting, for each image responsive to the textual query using the output type, a portion of the image that depicts data responsive to the textual query; generating instructions for an audible presentation of the data responsive to the textual query; and providing the instructions to a speaker to cause the speaker to provide the audible presentation of the data responsive to the textual query. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of for each of two or more images in a plurality of images: analyzing image data for the image using object recognition to determine an initial image category for the image from two or more categories; and determining whether the initial image category is included in a particular group of image categories; for at least one image from the two or more images for which the initial image category is included in the particular group of image categories: determining to use the initial image category as the image category for the image; for at least one image from the two or more images for which the initial image category is not included in the particular group of image categories: analyzing the image data for the image using text recognition to determine a second image category for the image from the two or more categories; and determining the image category for the image using the initial image category and the second image category; and storing, for each of the two or more images, data in a database that associates the image with the image category for the image. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The two or more categories may include the image category for images responsive to the textual query. Determining the response to the textual query using the images responsive to the textual query may include selecting, for each image responsive to the textual query using the output type, a portion of the image that depicts data responsive to the textual query. Providing, using the output type, the response to the textual query for presentation may include generating instructions for presentation of a user interface that emphasizes, for each image responsive to the textual query, the portion of the image that depicts the data responsive to the textual query; and providing the instructions to a display to cause the display to present the user interface and at least one of the images responsive to the textual query. Providing, using the output type, the response to the textual query for presentation may include generating instructions for an audible presentation of the data responsive to the textual query; and providing the instructions to a speaker to cause the speaker to provide the audible presentation of the data responsive to the textual query.

In some implementations, the method may include determining, using a textual query, an image category for images responsive to the textual query, and an output type that identifies a type of requested content; selecting, using data that associates a plurality of images with a corresponding category, a subset of the images that each belong to the image category, each image in the plurality of images belonging to one of the two or more categories; analyzing, using the textual query, data for the images in the subset of the images to determine images responsive to the textual query; selecting, for each image responsive to the textual query using the output type, a portion of the image that depicts data responsive to the textual query; generating instructions for presentation of a user interface that emphasizes, for each image responsive to the textual query, the portion of the image that depicts the data responsive to the textual query; and providing the instructions to a display to cause the display to present the user interface and at least one of the images responsive to the textual query.

In some implementations, the method may include determining, using the textual query, one or more key phrases for the textual query. Analyzing, using the textual query, data for the images in the subset of the images to determine images responsive to the textual query may include analyzing, using the one or more key phrases, data for the images in the subset of the images to determine images responsive to the textual query. Selecting the subset of the images may include selecting the subset of the images using the output type and the image category. Selecting the portion of the image that depicts data responsive to the textual query may include determining a bounding box for the image that surrounds the data responsive to the textual query; and selecting the portion of the image defined by the bounding box.

In some implementations, selecting the portion of the image that depicts data responsive to the textual query may include cropping, for at least one of the images responsive to the textual query, the image to remove content that is not responsive to the textual query. Cropping the image to remove content that is not responsive to the textual query may include cropping the image so that the data responsive to the textual query includes a fixed size or a percent of the cropped image. The method may include determining the percent of the cropped image using context depicted in the image. Determining the percent of the cropped image using context depicted in the image may include determine the percent of the cropped image using at least one of the data responsive to the query depicted in the image, text depicted in the image, or a boundary of an object depicted in the image.

In some implementations, generating the instructions for presentation of the user interface may include determining an output format using a quantity of the images responsive to the textual query or the output type or both; and generating the instructions for presentation of the user interface using the output format. Determining the output format may include determining that a single image from an image database depicts data responsive to the textual query; and in response to determining that a single image from the image database depicts data responsive to the textual query, selecting an output format that depicts, in the user interface, only data from the image. Determining the output format may include determining that multiple images from the plurality of images depict data responsive to the textual query; and in response to determining that multiple images from the plurality of images depict data responsive to the textual query, selecting a summary output format that depicts, in the user interface, a) a summary of the data responsive to the textual query from the multiple images and b) data from each of the multiple images. Generating the instructions for presentation of the user interface using the output format may include generating the instructions for presentation of the user interface that includes a) the summary of the data responsive to the textual query and b) the data from each of the multiple images. The summary output format may include the summary above the data for each of the multiple images. The summary may include a list of the data responsive to the textual query from the multiple images. The user interface may include a navigation control that enables a user to scroll through presentation of the data from each of the multiple images.

In some implementations, the method may include for each of two or more images in the plurality of images: analyzing image data for the image using object recognition to determine an initial image category for the image from the two or more categories; and determining whether the initial image category is included in a particular group of image categories; for at least one image from the two or more images for which the initial image category is included in the particular group of image categories: determining to use the initial image category as the image category for the image; for at least one image from the two or more images for which the initial image category is not included in the particular group of image categories: analyzing the image data for the image using text recognition to determine a second image category for the image from the two or more categories; and determining the image category for the image using the initial image category and the second image category; and storing, for each of the two or more images, data in a database that associates the image with the image category for the image. The method may include for each of the two or more images: receiving the image data before the image data is stored in an image database; and storing the image data in the image database. Analyzing the image data may be responsive to receiving the image data. Providing the instructions to a display to cause the display to present the user interface and at least one of the images responsive to the textual query may include providing the instructions to a display to cause the display to present an answer to the textual query in the user interface.

In some implementations, the method may include determining, using a textual query, an image category for images responsive to the textual query, and an output type that identifies a type of requested content; selecting, using data that associates a plurality of images with a corresponding category, a subset of the images that each belong to the image category, each image in the plurality of images belonging to one of the two or more categories; analyzing, using the textual query, data for the images in the subset of the images to determine images responsive to the textual query; selecting, for each image responsive to the textual query using the output type, a portion of the image that depicts data responsive to the textual query; generating instructions for an audible presentation of the data responsive to the textual query; and providing the instructions to a speaker to cause the speaker to provide the audible presentation of the data responsive to the textual query. Generating the instructions may include generating, for at least one of the images responsive to the textual query, instructions for an audible presentation of the data responsive to the textual query and that indicates a location of the portion of the image that depicts the data responsive to the query. Providing the instructions may include providing the instructions to the speaker to cause the speaker to provide, for the at least one of the images responsive to the textual query, the audible presentation of the data responsive to the textual query and that indicates a location of the portion of the image that depicts the data responsive to the query. The method may include generating instructions for presentation of a user interface that emphasizes, for each image responsive to the textual query, the portion of the image that depicts the data responsive to the textual query; and providing the instructions to a display to cause the display to present the user interface and at least one of the images responsive to the textual query.

The subject matter described in this specification can be implemented in various embodiments and may result in one or more of the following advantages. In some implementations, use of image categories when searching images may reduce an amount of image data analyzed for data responsive to a search query. In some implementations, presentation of a portion of an image, e.g., rather than the entire image, in response to a query may reduce network bandwidth, content processed to generate a user interface with search results, or both. In some implementations, an image query processing system may classify an image using an object recognition process, a text recognition process or both. Use of a single process, when a classification accuracy for the single process satisfies a threshold accuracy, may reduce processing resources used, e.g., reduce computation time. Use of both processes may improve classification analysis, e.g., when a classification accuracy based on using a single process does not satisfy a threshold accuracy. In some implementations, presentation of image content with text-based results may improve an accuracy of the system, e.g., enabling separate validation of responses. In some implementations, a query processing system that uses both an image category selector and a key phrase device may enable the query processing system to determine responsive data that other systems, without both the image category selector and the key phrase device, would not be able to determine.

In some implementations, a system that classifies an image using an object recognition process, a text recognition process, or both, may classify an image once, e.g., and does not need to classify an image each time the system receives a textual query for image data. In some implementations, a system that includes multiple classifiers, e.g., an object recognition classifier and a text recognition classifier, only needs to update classification analysis for images classified by the particular classifier, and not all images, when the particular classifier is updated. For instance, a system that classifies first images with an object classifier and second images with a text classifier, would only need to determine classifications for the second images classified with the text classifier, and not the first images, when the text classifier is updated.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

1.0 Example Environment

Figure 1A:
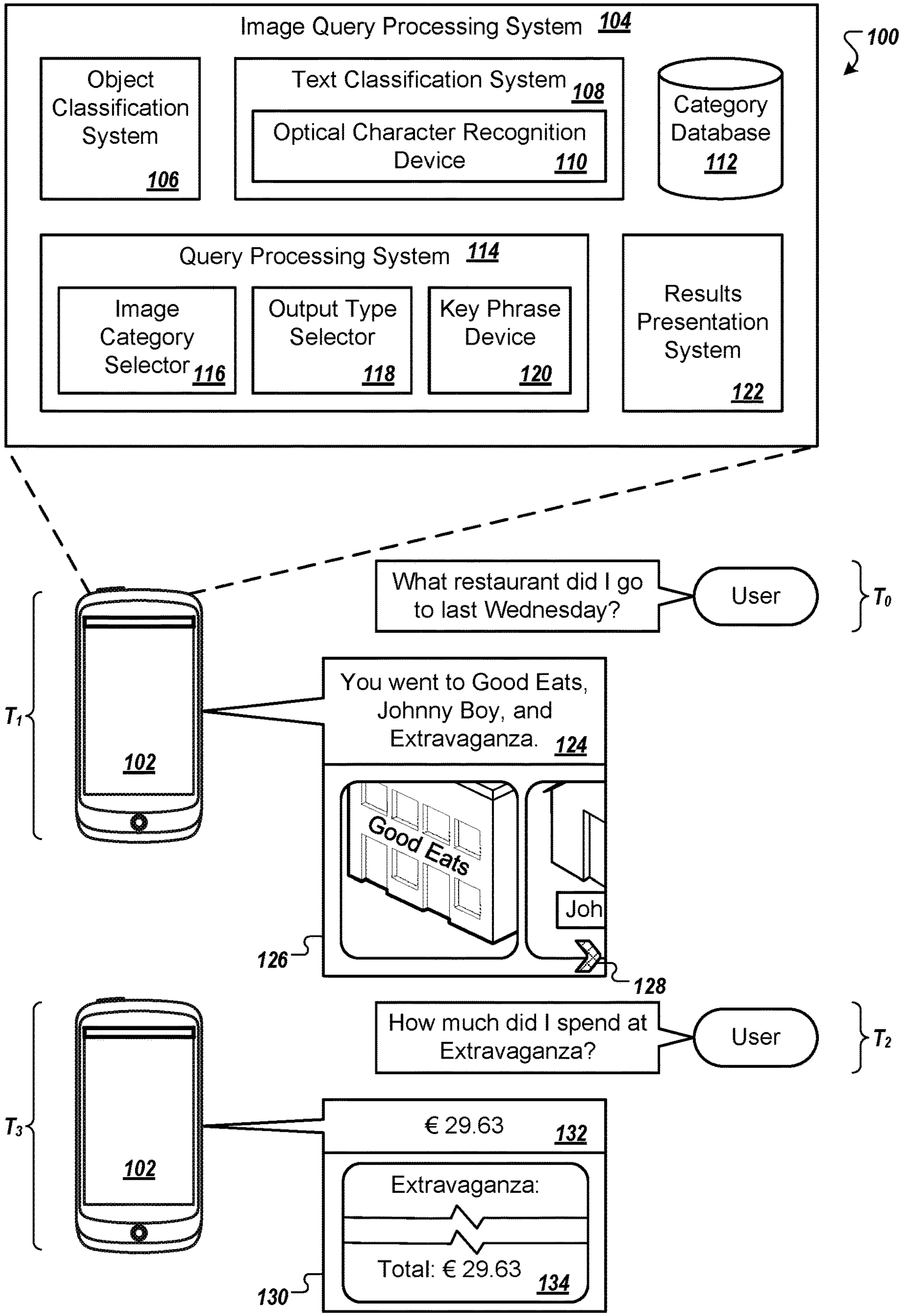
FIGS. 1A-B depict an example environment in which a device uses multiple different image categories to select images responsive to a query.
Figure 1B:
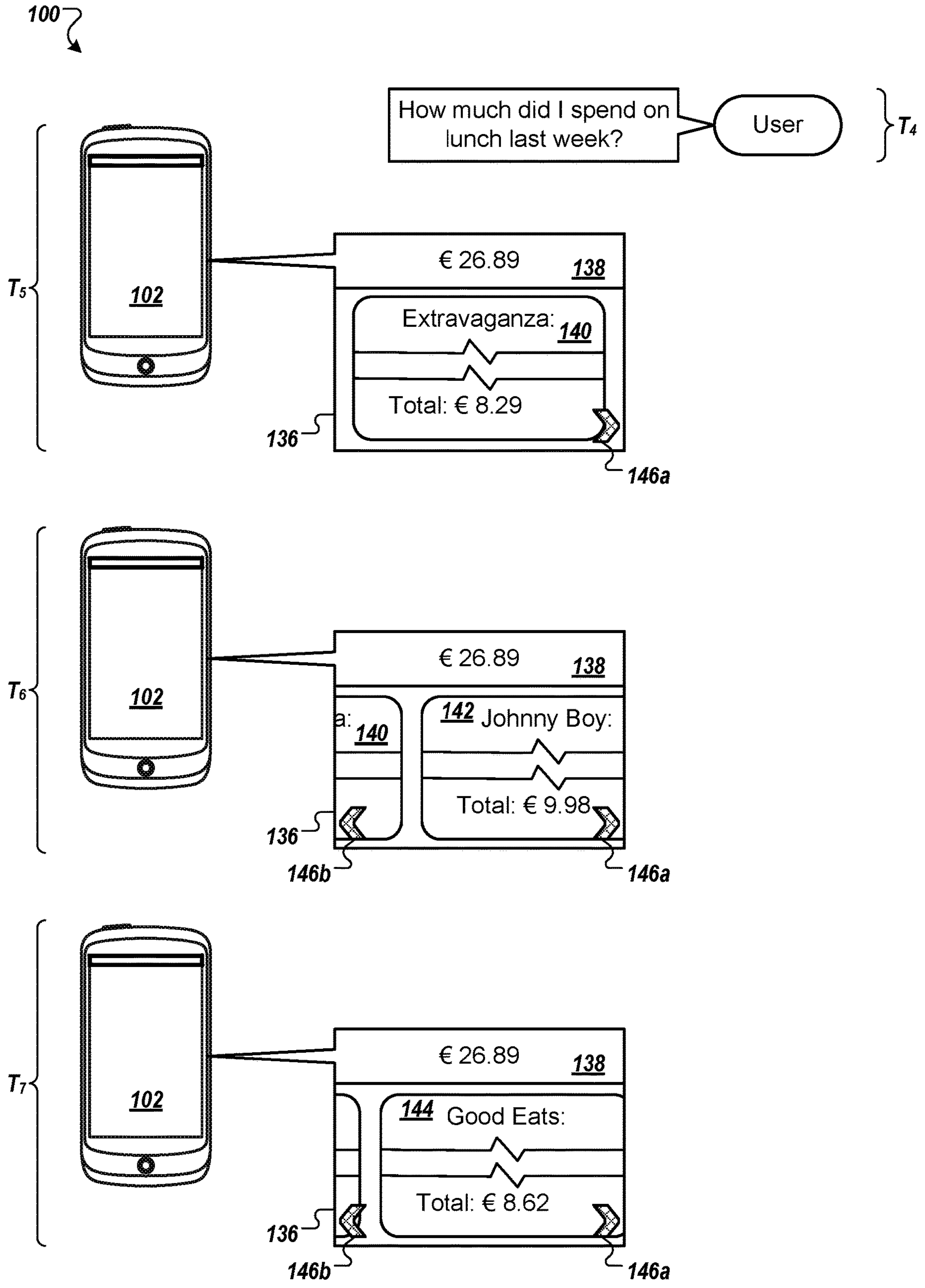

FIGS. 1A-B depict an example environment 100 in which a device 102 uses multiple different image categories to select images responsive to a query. As shown in FIG. 1A, the device 102 includes an image query processing system 104 that processes images each associated with at least one category from the multiple different image categories to determine image results responsive to a query. For instance, the image query processing system 104 may classify each image of multiple images based on content depicted in the image. Some categories may include landscape, cityscape, buildings, monuments, outer space, receipts, menu, ticket, presentation, and document.

The image query processing system 104 may use two classifiers to classify images into the multiple different image categories. For example, the image query processing system 104 may use an object classification system 106 that analyzes an image based on objects depicted in the image to determine an image category. The image query processing system 104 may use a text classification system 108 that analyzes an image based on words depicted in an image. The image query processing system 104 may use output from the object classification system 106, the text classification system 108, or both to determine a final image category for an image.

The object classification system 106 can analyze images using any appropriate process. For instance, the object classification system 106 can use machine learning to detect objects depicted in images and a likely image category for an image using the detected objects. In some examples, when the object classification system 106 determines that an image likely depicts office buildings, the object classification system 106 may assign "cityscape" to the image as a likely image category. When the object classification system 106 determines that an image likely depicts text, the object classification system 106 may assign "unknown" or "further processing required" or "text" as the image category for the image.

The image query processing system 104 may use the text classification system 108 depending on a potential type of image category determined by the object classification system 106. For instance, when the image query processing system 104 receives data from the object classification system 106 that indicates an image likely depicts text, the image query processing system 104 may cause the text classification system 108 to analyze the image to determine an image category for the image based on the depicted text. The text classification system 108 may determine some of the words depicted in the image and use the words to determine the image category. In some examples, the text classification system 108 may determine an image category based on a layout of text depicted in an image.

The text classification system 108 can use an optical character recognition device 110 to identify text depicted in an image. The optical character recognition device 110 can use any appropriate process to detect image depicted in an image. For example, the optical character recognition device 110 can de-skew the image, convert the image to grayscale, and perform character isolation to detect characters depicted in the image. The optical character recognition device 110 can use the detected characters to determine words, phrases, sentences, or a combination of these, that are depicted in the image.

The text classification system 108 can use the determined words to select an image category for the image. For instance, when the text classification system 108 determines that an image includes multiple line items, each with a corresponding cost, and a total cost toward the bottom of the image, the text classification system 108 may assign an image category of "receipt" to the image. When the text classification system 108 determines that a landscape oriented image or multiple associated images include page numbers and a presenter's name, the text classification system 108 may assign "presentation" to the image or images as the image category.

The image query processing system 104 can associate the image with the determined image category using data in a database, e.g., a category database 112. The category database 112 may store images, data that associates images with respective image categories, or both. For instance, when the image query processing system 104 receives an image, e.g., from a camera included in the device 102, the image query processing system 104 can determine an image category for the image, e.g., using the object classification system 106, the text classification system 108, or both. The image query processing system 104 can then store data in the category database 112 that associates the image with the determined image category. The image query processing system 104 may store the image in the category database 112.

When the image query processing system 104 receives a query for data from some of the multiple images, the image query processing system 104 may analyze the query to determine an image category likely to have data responsive to the query, an output type requested by the query, one or more keywords included in the query, or a combination of two or more of these. For example, at time $T_0$, the image query processing system 104 may receive a query of "what restaurant did I go to last Wednesday" from a user. The query may be any appropriate type of textual query. The query may be a spoke query, e.g., that is converted into text. The query may be a typed query, e.g., using touch input, a keyboard, or both. Other examples of queries can include "show the business card from bob," "how many pictures did I take when camping last week?", or "what was the name of the person I interviewed last Friday?", e.g., when the image query processing system 104 includes an image of the person, their resume, or both.

The image query processing system 104 can provide the query to a query processing system 114, included in the image query processing system 104, that analyzes the query to determine image results responsive to the query. The query processing system 114 includes an image category selector 116 that determines one or more image categories for the received query. For instance, the image category selector 116 may determine image categories of "receipts," "cityscapes," "buildings," "menu," or a combination of two or more of these, for the query "what restaurant did I go to last Wednesday?" The query processing system 114 can use the determined image category to select a subset of the images to search for data responsive to the query.

An output type selector 118, included in the query processing system 114, can use the query to determine an output type for the query. Some example output types include an image, an annotated image, a total cost, a textual summary, or a combination of two or more of these. An annotated image output type can indicate that the image query processing system 104 should output only a portion of an image in response to a query rather than the entire image. A total cost output type can indicate that the image query processing system 104 should output a sum of multiple different cost values, such as the costs for eating at a number of different restaurants during a week. The multiple different cost values can be depicted in a single image, e.g., a receipt that includes the cost for vegetables purchased this past weekend, can be depicted in multiple images, e.g., five receipts for the cost of eating a five restaurants throughout the week, or both. A textual summary output type can indicate that the image query processing system 104 should generate a summary of content depicted in multiple different images, such as a list of the names of restaurants at which a person ate during a week.

The query processing system 114 may use the determined output type to select a subset of the images to search for data, to select other processing parameters for determining responsive data, or both. Some examples of processing parameters include a portion of an image in which responsive data is likely to be located, e.g., a bottom portion of a receipt, types of processing to perform on an image, e.g., how to crop an image for presentation, or both. Based on the example query above, the query processing system 114 may determine that the output type should be a picture of the restaurant and select cityscapes as the image category. When the query processing system 114 determines a total cost output type, the query processing system may select receipts as the image category.

The query processing system 114 may use the determined output type to determine a location within an image to search for responsive data. For instance, when the output type is total cost, the query processing system 114 may determine to search a bottom portion of an image for the total cost of dinner at a restaurant. When the output type is a picture of a restaurant, the query processing system 114 may determine to search an upper third of an image for a name of the restaurant, e.g., while the lower portion of the image would depict the storefront for the restaurant.

In some examples, the query processing system 114 may use the determined output type to constrain an area within which to search for responsive data. The query processing system 114 may detect objects depicted in an image and search within the boundaries of one or more of those detected objects to detect responsive data within those boundaries. The responsive data may be text, depicted objects, or other appropriate data. The query processing system 114 may use the detected text to determine data responsive to the query. The responsive data may include some of the detected text, one of the detected objects, or both. For example, with the query "what restaurant did I go to last Wednesday?", the query processing system 114 may detect a sign depicted within an image, determine the text presented on the sign, e.g., the restaurant name, and use the determined text to determine a response to the query.

The query processing system 114 may determine text that was previously recognized in the image, e.g., and search a portion of the image for the previously determined text. When a portion of an image was not previously processed to determine text depicted in the portion, the query processing system 114 may determine text that was recognized in the image after receipt of the query. For instance, the query processing system 114 may detect objects depicted in an image, and select one or more of the depicted objects. The query processing system 114 may analyze the content for the depicted objects, e.g., using an optical character recognition process, to determine text included in the depicted objects.

A key phrase device 120, included in the query processing system 114, may determine one or more key phrases for a query. The query processing system 114 can use the determined key phrases, e.g., key words, to select images responsive to the query, e.g., in addition to using one or both of the determined image categories or the output type. For example, when the query is "what restaurant did I go to last Wednesday?", the query processing system 114 may select "Wednesday" as and "restaurant" as key phrases. The query processing system 114 can select a subset of images taken on the most recent Wednesday that depict cityscapes, which may include a storefront for the restaurant, that depict receipts for the most recent Wednesday, or both.

The query processing system 114 can analyzes the images in the selected subset using the key phrases. For instance, when the subset includes multiple images of a cityscape, the query processing system 114 may use the keyword "restaurant" to determine the images of restaurants. When the subset includes multiple receipt images, the query processing system 114 may use the keyword "restaurant" to determine which receipts from last Wednesday were for a restaurant rather than another purchase, e.g., coffee or a notebook.

The query processing system 114 may use one or more keywords to determine whether an image is more likely responsive than another image. The query processing system 114 may use a keyword to determine one or more text types for the keyword. The query processing system 114 can analyze an image to determine whether the image includes text that corresponds to the one or more determined text types. For instance, the query processing system 114 can use the keyword "restaurant" to determine text types of: restaurant phone number; restaurant name; restaurant menu types, e.g., breakfast, lunch, dinner, or a combination of two or more of these; hours of operation; or a combination of these. The query processing system 114 can analyze an image to determine whether the image includes data for some of the text types, such as a receipt that includes a restaurant phone number, restaurant name, and hours of operation.

The query processing system 114 can select an image based on the text types for which the image depicts content. For example, the query processing system 114 may determine a subset of images that includes three images: a first image that includes the name of a restaurant, e.g., a picture of the front of the restaurant; a second image that depicts a menu for the restaurant; and a third image that depicts a receipt from the restaurant with the restaurant name, hours of operation, and phone number. The query processing system 114 can use the quantity of text types for which the image depicts data to select one of the images from the subset. For instance, the query processing system 114 may select an image with the most, the fewest, or the average number of text types.

A results presentation system 122 included in the image query processing system 104 receives the results from the query processing system 114 and formats the results for presentation on a display. For instance, when there is a single image result, the results presentation system 122 may format the image for presentation on a display. Formatting the image may include determining a location of responsive data, e.g., the restaurant name, in the image and highlighting the responsive data, e.g., so that the responsive data is readily identifiable by a user who views the formatted image. Formatting the image may include cropping or extracting content from the image when the image is large so that the focus of the formatted image is on the responsive data. Cropping the image may reduce the amount of data sent to the display, sent over a network, e.g., when the results presentation system is remote from the display, or both.

The results presentation system 122 can present a summary 124 of the responsive data in addition to, or instead of, presenting at least a portion of a responsive image. For example, when the query processing system 114 determines that three images depict restaurant names, e.g., when a user ate at two restaurants last Wednesday and took a picture of another restaurant, the results presentation system 122 may generate a list of the three restaurant names for the summary 124. The summary 124 may indicate that "you went to Good Eats, Johnny Boy, and Extravaganza." The results presentation system 122 can generate instructions for a user interface 126 that will include the summary 124 with portions of the three images that depict the restaurant names.

The results presentation system 122 can send the instructions to a device, e.g., the device 102 or a display for the device 102, to cause the device to present the user interface 126, including the summary 124, during time period $T_1$. The user interface 126 may include a control element 128 that enables a user to scroll through presentation of the portions of the three images.

After presentation of the user interface 126 that includes the summary 124 with the list of three restaurant names, the device 102 may receive a subsequent query of "how much did I spend at Extravaganza" during time period $T_2$. The device 102 provides the input, or a representation of the input, e.g., when the input is speech input, to the image query processing system 104. The image query processing system 104 may perform processing as described above to determine an image responsive to the subsequent query. In some examples, the image query processing system 104 may determine to search the images responsive to the initial query given the sequence of the two queries, analysis of data for the two queries, e.g., that the summary 124 identified Extravaganza and the subsequent query referenced Extravaganza, or both.

The image category selector 116 may determine an image category of receipts for the subsequent query. The output type selector 118 may determine output types of cropped image and text summary for the subsequent query. The key phrase device 120 may determine key phrases of "Extravaganza" and "how much did I spend," e.g., or "total cost," for the subsequent query. The query processing system 114 may use the determined data to select, using the category database 112, images assigned to the receipt category. The query processing system 114 may search the selected images for receipts for Extravaganza, e.g., from this past Wednesday given the sequence of the two queries. The query processing system 114 may select an image of a single receipt responsive to the subsequent query and provide the image to the results presentation system 122. The query processing system 114 may determine a total cost of €29.63 and provide data for the total cost to the results presentation system 122.

The results presentation system 122 can generate instructions for presentation of a user interface 130 that includes a summary field 132 with the total cost and a cropped version 134 of the selected image. The cropped version 134 of the select image may highlight the relevant information from the image, such as the restaurant name, "Extravaganza," and the total cost of €29.63. The cropped version 134 may include the date, to indicate when the user spent €29.63 at Extravaganza.

The results presentation system 122 provides the instructions to the device 102 to cause the device 102 to present the user interface 130 during time period $T_3$. For instance, the results presentation system 122 may provide the instructions to a graphics system, included in the device 102, to cause the graphics system to present the user interface 130 on a display integrated into the device 102.

FIG. 1B depicts an example of the device 102 presenting multiple images that are each responsive to a query. The device 102 may present the images described with reference to FIG. 1B in addition to or instead of the images described with reference to FIG. 1A, e.g., depending on the queries received by the image query processing system 104.

In FIG. 1B, the device 102 receives the query "how much did I spend on lunch last week?" at time $T_4$. The device 102 provides the query, or the text for the query, to the image query processing system 104. The device 102 can include the image query processing system 104. In some examples, the image query processing system 104 is separate from the device 102, e.g., and the image query processing system 104 and the device 102 may communicate over a network.

The image query processing system 104 analyzes multiple images and selects three images that are responsive to the query, e.g., using one or more of the processes described above. For instance, the image query processing system 104 may determine that the user spent €8.29 at Extravaganza, €9.98 at Johnny Boy, and €8.62 at Good Eats using images of receipts for the respective restaurants, for a total of €26.89.

The image query processing system 104, e.g., the results presentation system 122, can determine an output format for a user interface in which to present responsive data using the quantity of selected images that are responsive to the query. For instance, when the image query processing system 104 determines that there is one responsive image, the image query processing system 104 may select an output format that includes only the image or data for the image along with the image. The image may be the entire image or a portion of the image determined to be relevant to the query. The data for the image may be data extracted from the image or data associated with the image, e.g., by another system. When the image query processing system 104 determines that there is more than one responsive image, the image query processing system 104 may select an output format that includes a summary of the responsive data, e.g., the names of the restaurants or a total cost, and portions of each of the images.

The image query processing system 104, e.g., the results presentation system 122, generates, e.g., using the determined output format, instructions for a user interface 136 that includes a summary 138 with a total cost of €26.89, and cropped images 140-144 for the three selected images. A first cropped image 140 may show a portion of the receipt for Extravaganza with the restaurant name and a €8.29 cost. A second cropped image 142 may show a portion of the receipt for Johnny Boy with the restaurant name and a €9.98 cost. A third cropped image 144 may show a portion of the receipt for Good Eats with the restaurant name and a €8.62 cost.

The user interface 136 may include one or more user interface controls **146*a-b* that enable a user to scroll through the cropped images 140-144. For instance, when the user interface 136 is unable to depict all of the cropped images 140-144 at the same time, the user interface controls 146*a-b* enable the user interface 136 to depict one of the cropped images 140-144, or a portion of one of the cropped images 140-144**, while presenting information that indicates that additional cropped images are available for presentation.

During time period $T_5$, the device 102 may present the user interface 136, using the instructions generated by the image query processing system 104, on a display, e.g., connected to the device 102. The user interface 136 may initially depict the first cropped image 140 for Extravaganza. Upon receipt of input indicating selection of a first user interface control **146*a*, the device 102 may scroll content presented in a portion of the user interface 136 that presents the cropped images 140-144. For instance, when the device 102 receives input indicating selection a right scroll user interface control 146*a*, the device 102 may present, during time period $T_6$, the second cropped image 142 for Johnny Boy. When the device receives additional input indicating selection of the right scroll user interface control 146*a*, the device 102 may present the third cropped image 144** for Good Eats during time period $T_7$.

In some implementations, the image query processing system 104 may allow selection of a cropped image as a request to view the entire corresponding image. For instance, when the image query processing system 104 receives input indicating selection of the third cropped image 144 for Good Eats, the image query processing system 104 may cause presentation of the entire receipt for Good Eats. The receipt may be depicted in one or more images, depending on how the images for the receipt were captured.

The use of image categories may enable the image query processing system 104 to determine data responsive to a query when a set of images that the image query processing system 104 searches is changing over time, e.g., as the device 102 captures, receives, or both, additional images. The use of image categories by the image query processing system 104 may enable the image query processing system 104 to search a set of images that includes multiple different types of images, that depict different types of content; may enable efficient search of the set of images, e.g., by pruning images from the set that are in different image categories; or both.

The image query processing system 104 is an example of a system implemented as computer programs on one or more computers in one or more locations, in which the systems, components, and techniques described in this document are implemented. The device 102 may include personal computers, mobile communication devices, such as a smart phone or a smart watch, and other devices. In some examples, the device 102 may be part of a server, a cloud computing system, or another system remote from a user, e.g., and which a client device connects to.

The image query processing system can include several different functional components, including the object classification system 106, the text classification system 108, the query processing system 114, and the results presentation system 122. The various functional components of the image query processing system 104 may be installed on one or more computers as separate functional components or as different modules of a same functional component. For example, the object classification system 106, the text classification system 108, the query processing system 114, the results presentation system 122, or two or more of these, can be implemented as computer programs installed on one or more computers in one or more locations that are coupled to each through a network. In cloud-based systems for example, these components can be implemented by individual computing nodes of a distributed computing system. The image query processing system 104 may be implemented on the device 102 or one or more other devices, e.g., a server system that communicates with the device 102 via a network.

In some implementations, the image query processing system 104 may include a subset of the components describe here. For instance, the image query processing system 104 may include the object classification system 106 and the text classification system 108, e.g., without the query processing system 114 or the results presentation system 122. In some examples, the image query processing system 104 may include the query processing system 114 and the results presentation system 122, e.g., without the object classification system 106 or the text classification system 108.

One or more of the components of the image query processing system 104 may be included in separate systems. For instance, the object classification system 106 may be part of a first system, e.g., one or more first computers, the text classification system 108 may be part of a second system, e.g., one or more second computers, and the query processing system 114 may be part of a third system, e.g., one or more third computers. The category database 112 may be implemented on a fourth system, e.g., one or more fourth computers. The results presentation system 122 may be part of the third system or a separate system, e.g., one or more fifth computers. In some examples, the object classification system 106 and the text classification system 108 may be part of the same system.

2.0 Example Response Generation Process Flow

Figure 2:
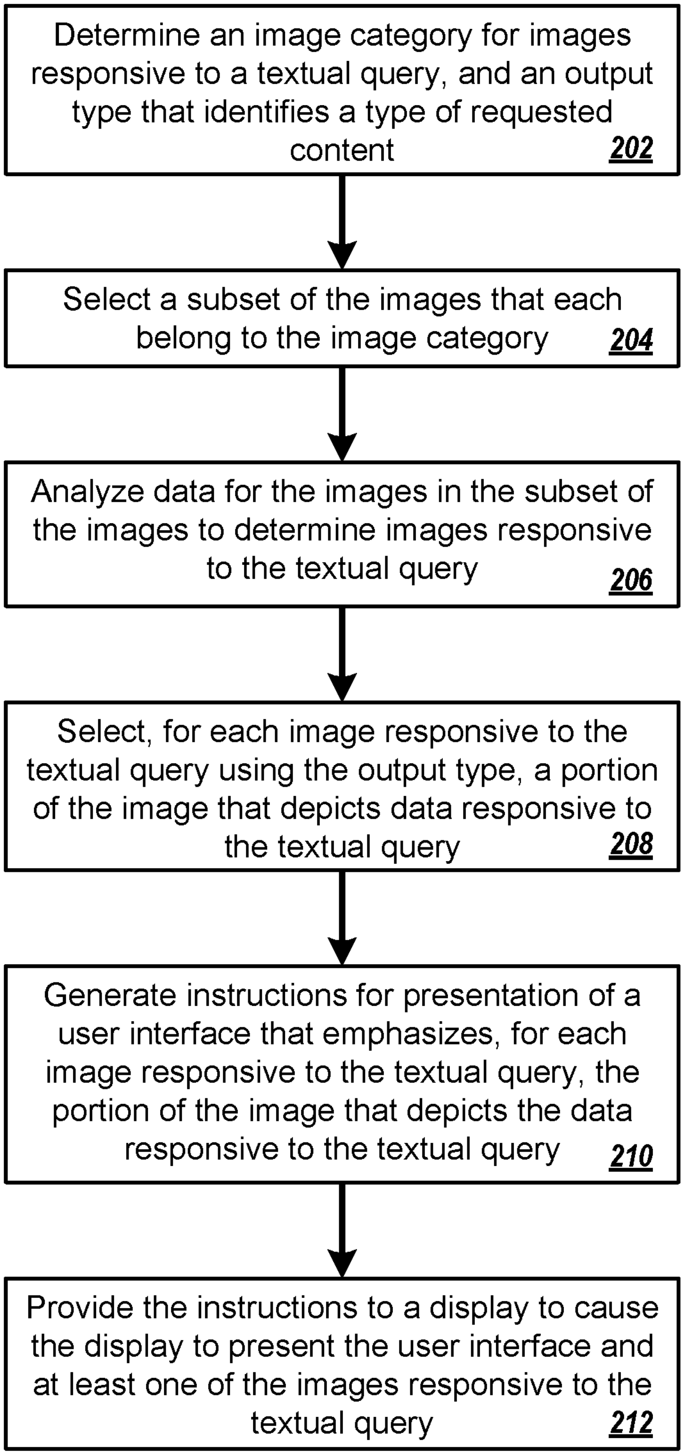
FIG. 2 is a flow diagram of a process for providing results responsive to a textual query.

FIG. 2 is a flow diagram of a process 200 for providing results responsive to a textual query. For example, the process 200 can be used by the image query processing system 104 from the environment 100.

An image query processing system determines an image category for images responsive to a textual query, and an output type that identifies a type of requested content (202). The image query processing system may receive input identifying the textual query from a microphone, a speech-to-text system, a keyboard, or another component of a device. The device may include, e.g., implement, the image query processing system. In some examples, the device may connect to the image query processing system over a network. The textual query includes one or more words, e.g., "what restaurant did I go to last Wednesday?"

The image query processing system selects a subset of the images that each belong to the image category (204). For instance, the image query processing system accesses a database of images and selects, from the database, the images that belong to the image category. The database includes images for each of multiple, e.g., two or more, different images categories. For example, the database can include pictures of people, pictures of receipts, pictures of landscapes, and pictures of monuments. The pictures may be from a recent trip taken by a user, e.g., a vacation to Greece, pictures captured in a user's hometown, or both.

The image query processing system analyzes data for the images in the subset of the images to determine images responsive to the textual query (206). For instance, the image query processing system uses context depicted in the images, e.g., image object analysis, one or more key phrases for the textual query, or both, to determine the images responsive to the query. In some examples, the image query processing system may use the output type to determine images responsive to the textual query.

In some implementations, the image query processing system may analyze data that includes text for the images to determine images responsive to the textual query. The text may be text generated using an optical character recognition process, e.g., by an optical character recognition device included in the image query processing system or another system. The text may include metadata for the image, e.g., that was preprocessed for the image. Some examples of metadata include a data identifying a timestamp for the image, the image category for the image, a textual description of the image, global positioning satellite coordinates near which the image was taken, a device used to capture the image, or a person depicted in the image.

The image query processing system selects, for each image responsive to the textual query using the output type, a portion of the image that depicts data responsive to the textual query (208). When the image query processing system determines that the output type is a cost, the image query processing system may select the portion of the image that depicts the responsive data, e.g., in a receipt. The responsive data may be an item on the receipt, such the name and corresponding cost for an item, like carrots, purchased from the grocery store. The responsive data may be the total cost for the purchase identified by the receipt. In some implementations, when the output type is the name of a restaurant, the image query processing system may select a portion of an image that depicts a sign for the restaurant, or a portion of a restaurant menu or a restaurant receipt that indicates the restaurant name. The image query processing system may select the entire image for output, or a proper subset of content depicted in the image. The selected portion of the image may be continuous, e.g., the top half of the image. The selected portion of the image may be discrete, e.g., the top and bottom quarters of the image.

The image query processing system, e.g., the results presentation system, may select the portion of the image that depicts the responsive data using any appropriate method. For instance, the image query processing system may use location data that indicates the location of the responsive data in the image and use the location data to extract the image content that depicts the responsive data from the image. The image query processing system may determine a bounding box for the image that includes the responsive data and extract the data defined by the bounding box from the image. The image query processing system might not process the entire image to determine the portion of the image that depicts the responsive data. For instance, when the image query processing system analyzes 38% of an image and identifies the responsive data in that 38%, the image query processing system can create a bounding box for the responsive data without analyzing the entire image.

The location data may be data determined by the image query processing system, data associated with the image, or both. For instance, as a part of the selection of the portion of the image, the image query processing system may process part or all of the image to determine location data that indicates a location of the responsive data within the image. In some examples, the image query processing system may access data for the image, e.g., metadata, that identifies locations of particular types of data, such as a restaurant name, total cost, or date associated with the image. The image query processing system, or another system, may preprocess the image to generate the data.

The image query processing system may determine a portion of the image that includes content other than the responsive data. For example, when the image query processing system determines a bounding box that surrounds the responsive data depicted in the image, e.g., the smallest possible bounding box that includes all of the responsive data, the image query processing system may expand the bounding box, and use the expanded bounding box to select the portion of the image that depicts the responsive data. The image query processing system may determine a size of the bounding box, the expanded bounding box, or both, based on a size of the responsive data, a fixed size, or another appropriate value. The image query processing system may determine the bounding box, or the portion of the image, such that the responsive data includes at least a percent of the selected portion. The image query processing system may determine a value for the percentage using the content depicted in the image. For instance, the image query processing system may determine the percent using the responsive data depicted in the image, text depicted in the image, a boundary of an object depicted in the image, or a combination of two or more of these.

In some implementations, the image query processing system may select the entire image. For instance, when the responsive data comprises at least a percent of the image, the image query processing system may select the entire image as the portion that depicts the responsive data. The image query processing system may select the entire image based on the type of image, e.g., a monument, outer space, portrait, or landscape; a predicted size of the responsive data, or both. For instance, the image query processing system may analyze less than all of the image, determine that the responsive data is likely depicted in at least a percent of the image, and, in response, select the entire image.

The image query processing system generates instructions for presentation of a user interface that emphasizes, for each image responsive to the textual query, the portion of the image that depicts the data responsive to the textual query (210). The emphasis may highlight the responsive data in the image. Some examples of emphasis may include changing a color for the responsive data to a color distinct from the other colors in the image, outlining the responsive data, e.g., in a box or an ellipse, cropping the image to primarily include the responsive data, extracting the responsive data from the image, or a combination of two or more of these.

When there are multiple responsive images, the image query processing system may format the user interface for presentation of the multiple images. The user interface may display some of the images at the same time. The user interface may display fewer than all the images at the same time, e.g., one image, and include user interface controls that enable presentation of others of the responsive images.

When an entire image includes data responsive to the textual query, the image query processing system may determine to skip emphasizing a portion of that image. The image query processing system may determine to emphasize a portion of another image, although the image query processing system does not emphasize a portion of the image. For example, the image query processing system may determine to skip emphasizing a portion of an image that depicts a restaurant name in more than a threshold percentage of the image, e.g., while emphasizing a restaurant name in a second image that takes up less than the threshold percentage of the second image.

The image query processing system provides the instructions to a display to cause the display to present the user interface and at least one of the images responsive to the textual query (212). For example, the image query processing system provides the instructions to a display, to a display system in a device, to another presentation system, or two or more of these. An example of another presentation system may include a voice output system that audibly presents some of the responsive data, e.g., a textual summary of the data depicted in the responsive images.

In some implementations, the user interface can include a textual summary of the responsive data, one or more responsive images, or both. For instance, when the image query processing system selects one responsive image, the user interface can include only that responsive image or only a portion of that responsive image. The image query processing system may format the user interface using the output type.

In addition to, or instead of, presentation of the user interface, the image query processing system can generate instructions for an audible presentation of data responsive to the textual query. For instance, the image query processing system can generate instructions for an audible presentation of data responsive to the textual query. The data responsive to the query may be a summary of data depicted in one or more images, e.g., a total spent on groceries or eating out for a week, may include data from multiple responsive images, e.g., indicating the names of the restaurants at which a person ate last week, or other appropriate data, e.g., based on the output types. One example of an audible presentation may be that the system "found a receipt from last Friday. It indicates on the top that it is from Starbucks on Broadway 12. On the bottom it shows a total of 12 US dollars."

The image query processing system may provide the instructions for the audible presentation to a speaker, e.g., instead of providing instructions for a user interface to a display. In some examples, the audible presentation may indicate that a visual presentation is available upon request. For instance, the audible presentation may include the prompt: "do you want to see a copy of the receipt?"

In some implementations, the process 200 can include additional steps, fewer steps, or some of the steps can be divided into multiple steps. For example, the image query processing system can cause presentation of the user interface, on a display, that includes at least one portion of an image, receive input selecting a displayed image, and in response to the input, cause presentation of the full image on the display. In some examples, the image query processing system receives the textual query and then performs step 202 in response to the receipt of the textual query.

In some examples, the image query processing system can perform steps 202 through 206 without performing steps 208 through 212. For instance, instead of selecting a portion of an image that depicts data responsive to the textual query and performing the subsequent operations, the image query processing system may determine a response to the textual query using the images responsive to the textual query and provide, using the output type, the response to the textual query for presentation. The response may be a visual response, e.g., as part of a user interface, an audible response, e.g., presented by a speaker, or both. In these examples, the image query processing system may optionally provide presentation of a portion of an image.

2.1 Example Image Analysis Process Flow

Figure 3:
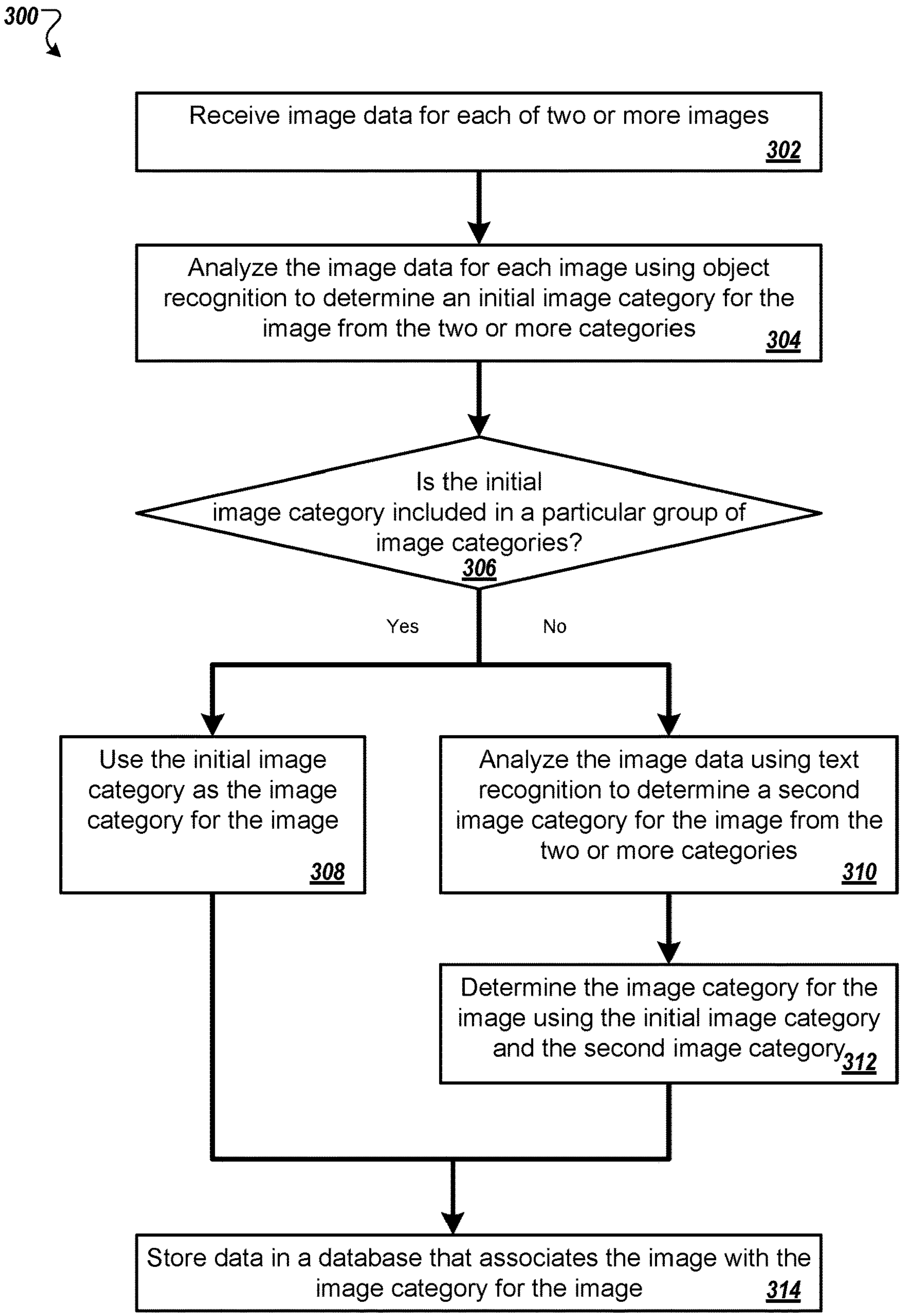
FIG. 3 is a flow diagram of a process for categorizing images.

FIG. 3 is a flow diagram of a process 300 for categorizing images. For example, the process 300 can be used by the image query processing system 104 from the environment 100.

An image query processing system receives image data for each of two or more images (302). The image query processing system may receive the image data at different times. The image query processing system may receive the image data from different devices or systems. For instance, the image query processing system may receive a first image from a camera incorporated into a mobile device, e.g., when the mobile device implements the image query processing system. The image query processing system may receive a second image, different from the first image, from a network connected device, e.g., that provided the second image to the mobile device. In some examples, the image query processing system may perform the process 300 for one image and, where necessary, perform only one of multiple alternative steps.

The image query processing system analyzes the image data for each image using object recognition to determine an initial image category for the image from the two or more categories (304). The image query processing system may include an object recognition device that determines the initial image category for each of the images.

The image query processing system determines whether the initial image category is included in a particular group of image categories (306). For example, the image query processing system may determine whether the image category indicates that the image likely does not include text. Some example categories for the particular group of image categories include landscapes, portraits, cityscapes, and outer space.

In response to determining that the initial image category is included in the particular group of image categories, the image query processing system uses the initial image category as the image category for the image (308). For instance, the image query processing system may determine that the first image has an initial image category of "outer space" and assigns that image category to the first image.

In response to determining that the initial image category is not included in the particular group of image categories, the image query processing system analyzes the image data using text recognition to determine a second image category for the image from the two or more categories (310). For example, the image query processing system may determine that the initial image category is "text," and provides image data for the image to an optical character recognition device for further analysis. Some examples of the second image category include receipt, document, presentation, menu, and ticket.

The image query processing system determines the image category for the image using the initial image category and the second image category (312). For instance, the image query processing system may use the second image category as the image category for the image.

In some implementations, the image query processing system may assign multiple image categories to an image. For instance, when an image depicts a person holding a restaurant menu while standing in front of the restaurant, the image query processing system may assign initial image categories of "storefront" and "text" to the image. Upon further analysis of the image, e.g., by the optical character analysis device, the image query processing system may determine final image categories of "storefront" and "menu" for the image, potentially including "portrait" as well for the person depicted in the image.

The image query processing system stores data in a database that associates the image with the image category for the image (314). The database may include the image data. For example, the image query processing system may store the image data and the data that associates the image with the image category in an image database. The database might not include the image data, e.g., and may be a category database.

In some implementations, the process 300 can include additional steps, fewer steps, or some of the steps can be divided into multiple steps. For example, the process 300 may include either step 308 or steps 310-312, and not both sets of steps. In some implementations, the process 300 may include one or more of the steps of the process 200. For instance, an image query processing system may perform one or more of the steps from the process 300, e.g., multiple times, and then perform one or more of the steps of the process 200.

3.0 Additional Implementation Details

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HyperText Markup Language (HTML) page, to a user device, e.g., for purposes of displaying data to and receiving user input from a user interacting with the user device, which acts as a client. Data generated at the user device, e.g., a result of the user interaction, can be received from the user device at the server.

Figure 4:
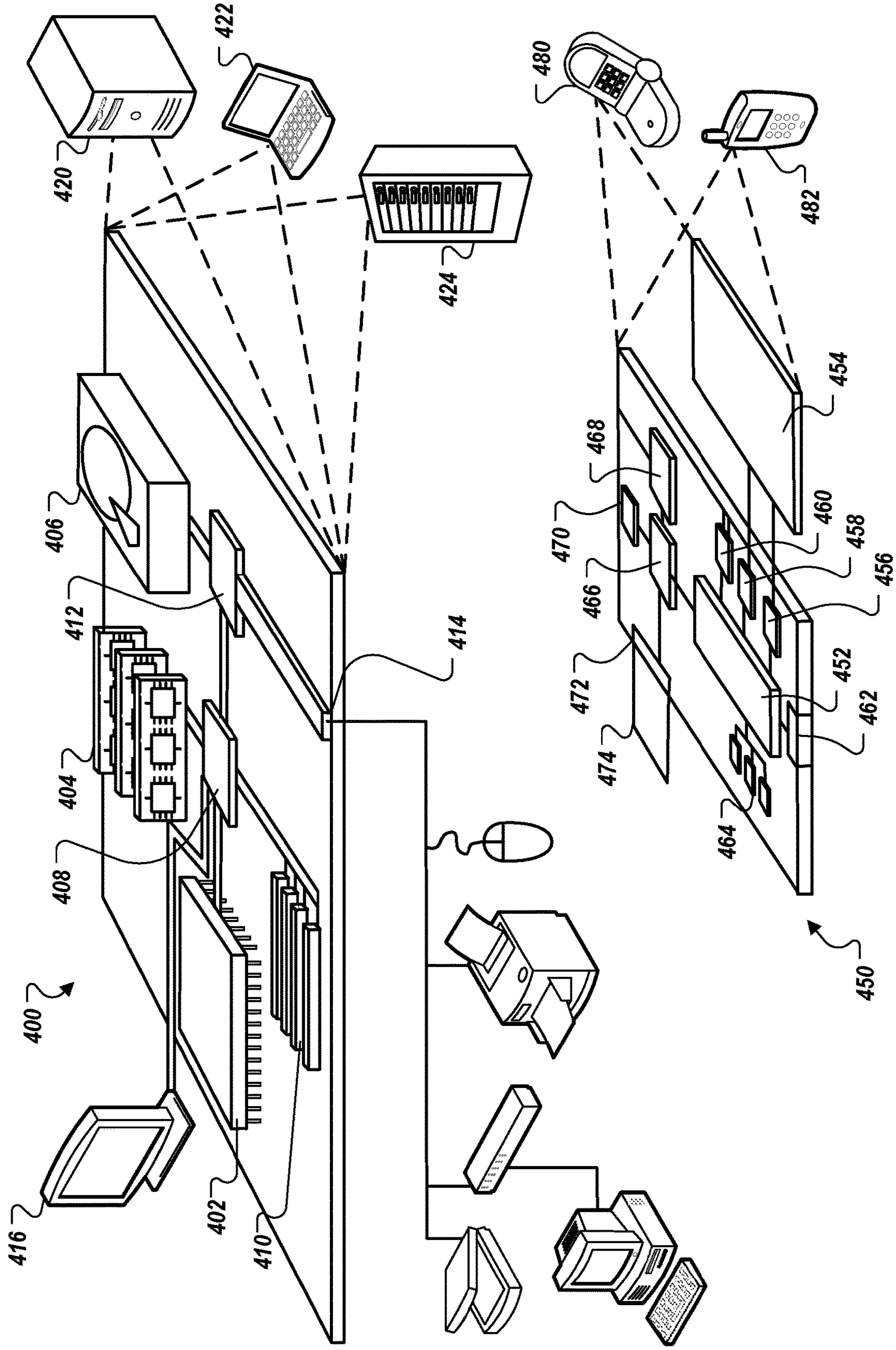
FIG. 4 is a block diagram of a computing system that can be used in connection with computer-implemented methods described in this document.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising one or more computers and one or more storage devices on which are stored instructions that are operable, when executed by the one or more computers, to cause the one or more computers to perform operations comprising:

determining, using a textual query, an image category for images responsive to the textual query, and an output type that identifies a type of requested content;

selecting, using data that associates a plurality of images with a corresponding category, a subset of the images that each belong to the image category, each image in the plurality of images belonging to one of two or more categories;

analyzing, using the textual query, data for the images in the subset of the images to determine images responsive to the textual query;

determining a response to the textual query using the images responsive to the textual query; and providing, using the output type, the response to the textual query for presentation.

2. The system of claim 1, wherein providing, using the output type, the response to the textual query for presentation comprises:

generating instructions for an audible presentation of the data responsive to the textual query; and providing the instructions to a speaker to cause the speaker to provide the audible presentation of the data responsive to the textual query.

3. The system of claim 1, wherein:

determining the response to the textual query using the images responsive to the textual query comprises selecting, for each image responsive to the textual query using the output type, a portion of the image that depicts data responsive to the textual query; and providing, using the output type, the response to the textual query for presentation comprises:

generating instructions for presentation of a user interface that emphasizes, for each image responsive to the textual query, the portion of the image that depicts the data responsive to the textual query; and providing the instructions to a display to cause the display to present the user interface and at least one of the images responsive to the textual query.

4. The system of claim 3, wherein selecting the subset of the images comprises selecting the subset of the images using the output type and the image category.

5. The system of claim 3, wherein selecting the portion of the image that depicts data responsive to the textual query comprises:

determining a bounding box for the image that surrounds the data responsive to the textual query; and selecting the portion of the image defined by the bounding box.

6. The system of claim 3, wherein selecting the portion of the image that depicts data responsive to the textual query comprises cropping, for at least one of the images responsive to the textual query, the image to remove content that is not responsive to the textual query.

7. The system of claim 6, wherein cropping the image to remove content that is not responsive to the textual query comprises cropping the image so that the data responsive to the textual query comprises a fixed size or a percent of the cropped image.

8. The system of claim 7, the operations comprising:

determining the percent of the cropped image using context depicted in the image.

9. The system of claim 8, wherein determining the percent of the cropped image using context depicted in the image comprises determine the percent of the cropped image using at least one of the data responsive to the query depicted in the image, text depicted in the image, or a boundary of an object depicted in the image.

10. The system of claim 3, wherein generating the instructions for presentation of the user interface comprises:

determining an output format using a quantity of the images responsive to the textual query or the output type or both; and generating the instructions for presentation of the user interface using the output format.

11. The system of claim 10, wherein determining the output format comprises:

determining that a single image from an image database depicts data responsive to the textual query; and in response to determining that a single image from the image database depicts data responsive to the textual query, selecting an output format that depicts, in the user interface, only data from the image.

12. The system of claim 10, wherein:

determining the output format comprises:

determining that multiple images from the plurality of images depict data responsive to the textual query; and in response to determining that multiple images from the plurality of images depict data responsive to the textual query, selecting a summary output format that depicts, in the user interface, a) a summary of the data responsive to the textual query from the multiple images and b) data from each of the multiple images; and generating the instructions for presentation of the user interface using the output format comprises generating the instructions for presentation of the user interface that includes a) the summary of the data responsive to the textual query and b) the data from each of the multiple images.

13. The system of claim 12, wherein the summary output format includes the summary above the data for each of the multiple images.

14. The system of claim 12, wherein the summary comprises a list of the data responsive to the textual query from the multiple images.

15. The system of claim 12, wherein the user interface comprises a navigation control that enables a user to scroll through presentation of the data from each of the multiple images.

16. The system of claim 3, wherein providing the instructions to a display to cause the display to present the user interface and at least one of the images responsive to the textual query comprises providing the instructions to a display to cause the display to present an answer to the textual query in the user interface.

17. The system of claim 1, comprising:

for each of two or more images in the plurality of images:

analyzing image data for the image using object recognition to determine an initial image category for the image from the two or more categories; and determining whether the initial image category is included in a particular group of image categories;

for at least one image from the two or more images for which the initial image category is included in the particular group of image categories:

determining to use the initial image category as the image category for the image;

for at least one image from the two or more images for which the initial image category is not included in the particular group of image categories:

analyzing the image data for the image using text recognition to determine a second image category for the image from the two or more categories; and determining the image category for the image using the initial image category and the second image category; and storing, for each of the two or more images, data in a database that associates the image with the image category for the image.

18. The system of claim 17, the operations comprising:

for each of the two or more images:

receiving the image data before the image data is stored in an image database; and storing the image data in the image database, wherein analyzing the image data is responsive to receiving the image data.

19. The system of claim 1, the operations comprising determining, using the textual query, one or more key phrases for the textual query, wherein analyzing, using the textual query, data for the images in the subset of the images to determine images responsive to the textual query comprises analyzing, using the one or more key phrases, data for the images in the subset of the images to determine images responsive to the textual query.

20. A non-transitory computer storage medium encoded with instructions that, when executed by one or more computers, cause the one or more computers to perform operations comprising:

for each of two or more images in a plurality of images:

analyzing image data for the image using object recognition to determine an initial image category for the image from two or more categories; and determining whether the initial image category is included in a particular group of image categories;

for at least one image from the two or more images for which the initial image category is included in the particular group of image categories:

determining to use the initial image category as the image category for the image;

for at least one image from the two or more images for which the initial image category is not included in the particular group of image categories:

analyzing the image data for the image using text recognition to determine a second image category for the image from the two or more categories; and determining the image category for the image using the initial image category and the second image category; and storing, for each of the two or more images, data in a database that associates the image with the image category for the image.

21. The computer storage medium of claim 20, the operations comprising:

for each of the two or more images:

receiving the image data before the image data is stored in an image database; and storing the image data in the image database, wherein analyzing the image data is responsive to receiving the image data.

22. A computer-implemented method comprising:

determining, using a textual query, an image category for images responsive to the textual query, and an output type that identifies a type of requested content;

selecting, using data that associates a plurality of images with a corresponding category, a subset of the images that each belong to the image category, each image in the plurality of images belonging to one of two or more categories;

analyzing, using the textual query, data for the images in the subset of the images to determine images responsive to the textual query;

selecting, for each image responsive to the textual query using the output type, a portion of the image that depicts data responsive to the textual query;

generating instructions for an audible presentation of the data responsive to the textual query; and providing the instructions to a speaker to cause the speaker to provide the audible presentation of the data responsive to the textual query.

23. The method of claim 22, wherein:

generating the instructions comprises generating, for at least one of the images responsive to the textual query, instructions for an audible presentation of the data responsive to the textual query and that indicates a location of the portion of the image that depicts the data responsive to the query; and providing the instructions comprises providing the instructions to the speaker to cause the speaker to provide, for the at least one of the images responsive to the textual query, the audible presentation of the data responsive to the textual query and that indicates a location of the portion of the image that depicts the data responsive to the query.

24. The method of claim 22, comprising:

generating instructions for presentation of a user interface that emphasizes, for each image responsive to the textual query, the portion of the image that depicts the data responsive to the textual query; and providing the instructions to a display to cause the display to present the user interface and at least one of the images responsive to the textual query.

* * * * *